Feb. 11, 1969    D. W. RHYS ET AL    3,427,140
TIP OF RUTHENIUM METAL FOR SOLDERING IRON
Filed Aug. 3, 1966
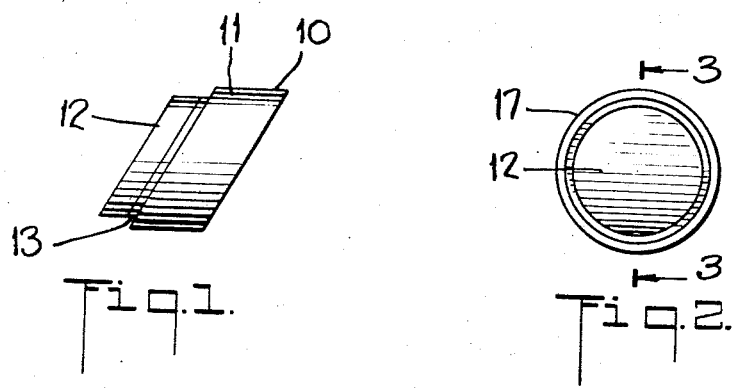
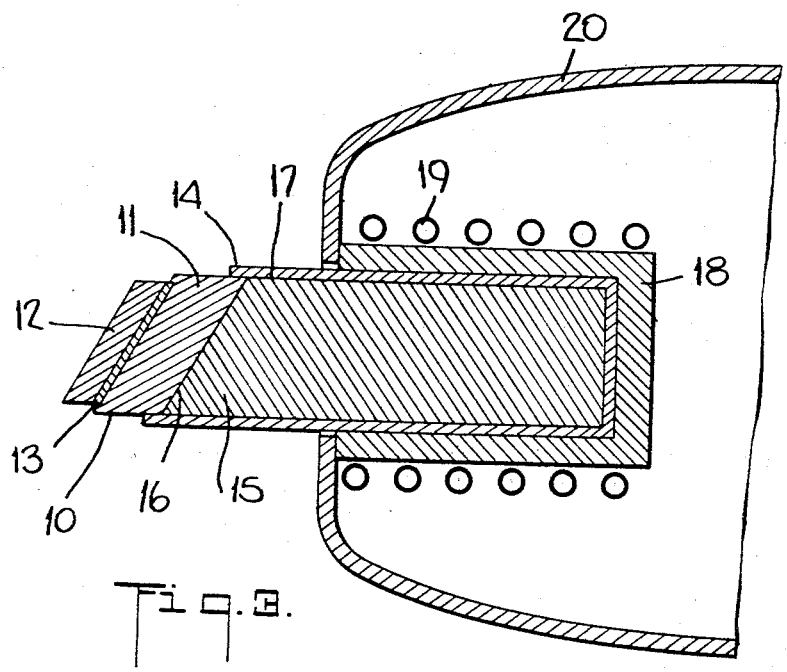
INVENTORS
DAVID WADE RHYS
ROY DAVID BERRY
M. L. Pinel
ATTORNEY

United States Patent Office 3,427,140
Patented Feb. 11, 1969

3,427,140
TIP OF RUTHENIUM METAL FOR SOLDERING IRON
David Wade Rhys, Gerrards Cross, and Roy David Berry, High Wycombe, England, assignors to The International Nickel Company, Inc., New York, N.Y., a corporation of Delaware
Filed Aug. 3, 1966, Ser. No. 569,853
Claims priority, application Great Britain, Aug. 16, 1965, 35,014/65; Jan. 11, 1966, 1,296/66
U.S. Cl. 29—199     9 Claims
Int. Cl. B23k 3/02

ABSTRACT OF THE DISCLOSURE

Tip for soldering iron has a ruthenium metal body that is coated with palladium, platinum and/or copper.

---

The present invention relates to soldering iron apparatus and more particularly, to soldering iron tips having improved resistance to corrosion by soldering materials.

Heretofore, bits for soldering irons have been commonly made of copper. Past experience has shown that copper soldering-iron bits are attacked by molten solder, the rate of attack increasing rapidly with increase in temperature, e.g., in the range 250° C. to 500° C. Hence, difficulties are encountered in keeping copper soldering bits sufficiently clean for continuously making good soldered joints, particularly when soldering is performed with automatic machines. In production departments where soldering irons operate continuously at 400° C., the lift of a copper bit has been found to be only 2 to 3 days. Although some improvement in the useful life of soldering iron bits has been obtained by applying coatings of iron, nickel or aluminum, the thickness and useful lives of these coatings have been of unsatisfactorily limited duration due to factors associated with thermal conductivity and differential thermal expansion. In addition to undesired costs for replacing and/or cleaning soldering bits, high expenses can arise from production time losses if production lines must be shut down because of malfunctioning of soldering apparatus.

Solders are commonly alloys of lead and tin and it is well known that ruthenium exhibits good resistance to attack by molten lead and tin. However, we have found that solder does not readily wet ruthenium and that a ruthenium surface for a soldering tip must be abrasively ground, rather than be in a hot rolled, cold rolled, emery polished, hydrogen annealed or vacuum annealed condition in order to obtain complete wettability by molten solder and even when the ruthenium is suitably ground, the wetting by solder is undesirably difficult to accomplish and requires an induction period prior to use. Accordingly, the mere use of a ruthenium tip is not a solution to the problem of providing a satisfactory soldering bit which is characterized by good corrosion resistance to molten solder at temperatures up to 500° C.

Although many attempts were made to overcome the foregoing difficulties and other difficulties and disadvantages, none, as far as we are aware, was entirely successful when carried into practice commercially on an industrial scale.

It has now been discovered that improved resistance to corrosion and good wettability for soldering are achieved with a soldering bit comprising a ruthenium tip having a special metallic coating.

It is an object of the present invention to provide a soldering iron tip which has improved resistance to corrosion by molten solders of the lead-tin type and which is readily wet by such solders.

A further object of the invention is to provide soldering iron tips which have improved long life and which remain clean during extended use.

Another object of the invention is to provide a soldering iron bit having a corrosion resistant tip.

Other objects and advantages will become apparent from the following description taken in conjunction with the accompanying drawing in which:

FIGURE 1 illustrates a side view of a soldering iron tip in accordance with the invention;

FIGURE 2 depicts a front view of a soldering iron bit having attached thereto the soldering iron tip illustrated in FIGURE 1; and FIGURE 3 shows a cross-sectional view, taken at line 3—3 in FIGURE 2, of the soldering iron bit depicted in FIGURE 2.

Generally speaking, the present invention is directed to a new soldering iron tip comprising a ruthenium metal body and a metallic coating of palladium, platinum, copper or an alloy thereof. The metallic coating, which can be alloyed with the ruthenium body by diffusion, provides a surface which is readily wet by molten solders of the lead-tin type. The ruthenium body has excellent resistance to corrosion by solder and solder fluxes. Inasmuch as the coating serves to provide wettability and is not needed for protection of the body, the coating need not cover the entire body and is only needed at the soldering surface of the tip, i.e., the surface (or surfaces) of the tip which are required to be readily wettable by molten solder.

During use in contact with molten solder, the tip becomes coated with a surface deposit, which appears to be a grey ruthenium-tin compound that acts as a barrier layer to corrosion attack. This deposit, when formed, also seems to promote good wetting of the tip by solder. Accordingly, any corrosion of the metal coating which may occur after the tip is tinned and the aforementioned surface deposit is formed does not detract from the success of the invention.

Ruthenium metal referred to herein for the new tip includes pure forms of ruthenium, e.g., commercially pure ruthenium, and solder-corrosion resistant ruthenium alloys, e.g., ruthenium-base alloys containing rhenium. An advantageous ruthenium alloy which is more readily worked than pure ruthenium is the ruthenium alloy with 0.25% to 2.5% rhenium, which is described in the Jones and Gainsbury U.S. patent application Ser. No. 454,659, filed May 10, 1965, now U.S. Patent No. 3,362,799. Other ruthenium alloys which can be used for the tip include ruthenium to which additions of up to about 2% of palladium or platinum or iridium or combinations of these are made.

The metallic coating for the soldering surface of the tip can be electrodeposited in place. While the coating is principally of metal from the group consisting of palladium, platinum and copper, it is to be understood that alloys of these metals with other metals which do not destroy wettability and corrosion resistance of the new tip are also within the scope of the invention. Thickness of the coating is about 0.00005 inch to about 0.01 inch. Where the coating is palladium or platinum, a particularly good thickness is desirably about 0.0001 inch. For copper coatings the thickness is desirably about 0.001 inch. Palladium or platinum coatings can be diffused with the ruthenium metal body by heating in hydrogen at 800° C. to 1400° C. For instance, a palladium coating can be satisfactorily diffused by heating for 15 minutes at 1000° C. Copper coatings for tips in accordance with the invention can be diffused and thereby alloyed with the ruthenium by heating in hydrogen at 600° C. to 1000° C., e.g., heating for 15 minutes at 800° C. Good wettability without detriment to the corrosion resistance of the ruthenium tip is obtained with either diffused or undiffused coatings of palladium, platinum or copper. Especially good wettability was obtained with a coating of diffused platinum or undiffused copper.

Tinning of the tips before use can be done by dipping in molten solder, say for 5 minutes at 350° C.

Attachment of the new tip to a soldering iron bit can be done by brazing, welding, mechanical attachment, e.g., by bolting, or any other suitable means.

Turning now to the drawing, FIGURE 1, which illustrates an advantageous example of the new soldering iron tip, shows tip 10 having ruthenium metal body 11 and coating 12. The body is of a ruthenium-rhenium alloy containing 0.25% to 2.5% rhenium, e.g., about 2% rhenium, and balance essentially ruthenium. The coating is palladium which has been thermally diffused with the ruthenium metal body at interface zone 13. The body is of a circular cross-section illustrated in FIGURE 2, wherein coating 12, which is at the soldering surface of the tip, is also illustrated. FIGURE 3 shows a longitudinal cross-section of an advantageous embodiment of the soldering iron bit provided by the invention. In FIGURE 3, bit 14 comprises copper shank 15, which is brazed to tip 10 at junction 16, at the front end of the shank, and also comprises nickel-chromium alloy skin 17. The protective nickel-chromium alloy skin extends from the rear edge of the tip to the rear end of the shank and surrounds the surfaces of the shank, thereby providing protection of the copper shank against corrosive attack. The skin is a highly advantageous feature, especially for use in situations where the shank as well as the tip is dipped in molten solder and solder temperatures are as high as 400° C. Nickel, e.g., electrodeposited nickel, is also a good material for the skin. The skin can be of a convient substantial thickness since it is not a soldering surface. The shank fits into heat-conducting sleeve 18 around which is electrical winding 19 housed in nose 20 of the iron. Alternatively in simple irons a strong metal stem may be provided for attaching the shank to a handle.

Test results have shown that the new soldering iron tip is characterized by good wettability and good corrosion resistance while in contact with molten solder, such as 60:40 tin-lead solder, and in contact with air and solder flux at 400° C. for periods up to 500 hours and longer. Tests by immersion of unprotected copper shanks in solder at 400° C. have shown need for a protective skin inasmuch as unprotected copper shanks were completely dissolved by the solder after 5 hours' immersion, while the ruthenium tip of the invention is unattacked. Of additional advantage, the new tip remains clean during extended use.

The present invention is particularly applicable to providing soldering iron bits and tips for use with lead-tin solders at temperatures of 250° C. to 500° C. and is of especially high benefit in providing enhanced life and cleanliness of soldering iron tips used where solder temperatures are about 400° C. and higher. The invention provides for savings in costs of replacing and maintaining soldering apparatus and for savings in avoidance of lost production time due to faulty operation of soldering tips or time lost in replacement or maintenance of tips, especially in automatized soldering apparatus.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A soldering iron tip comprising a ruthenium metal body and a coating thereon of metal from the group consisting of palladium, platinum, copper and alloys thereof.

2. A soldering iron tip as set forth in claim 1 wherein the ruthenium metal body is made of an alloy consisting essentially of 0.25% to 2.5% rhenium and balance ruthenium.

3. A soldering iron tip as set forth in claim 1 wherein the ruthenium metal body is made of commercially pure ruthenium.

4. A soldering iron tip as set forth in claim 1 wherein the coating metal is copper.

5. A soldering iron tip as set forth in claim 1 wherein the coating metal is palladium and is interdiffused with the ruthenium metal body.

6. In a soldering iron, an improved corrosion resistant soldering tip comprising a ruthenium metal body having on a surface thereof a coating of metal selected from the group consisting of palladium, platinum, copper and alloys thereof.

7. A soldering iron bit having, in combination, a shank and a soldering tip comprising a ruthenium metal body and a coating thereon of metal from the group consisting of palladium, platinum, copper and alloys thereof.

8. A soldering iron bit as set forth in claim 7 wherein the coating metal is copper.

9. A soldering iron bit as set forth in claim 7 wherein the coating metal is palladium and is interdiffused with the ruthenium metal body.

References Cited

UNITED STATES PATENTS

| | | | |
|---|---|---|---|
| 2,472,296 | 6/1949 | Hartnell | 29—199 |
| 2,588,531 | 3/1952 | Johnson | 29—199 XR |
| 2,679,223 | 5/1954 | Franklin | 29—199 XR |
| 3,162,512 | 12/1964 | Robinson | 29—199 |

HYLAND BIZOT, *Primary Examiner.*

U.S. Cl. X.R.

29—194; 228—54